March 15, 1966  A. M. SINGLETON  3,240,461

SUCTION DEVICES

Filed Feb. 2, 1965  3 Sheets-Sheet 1

March 15, 1966   A. M. SINGLETON   3,240,461
SUCTION DEVICES

Filed Feb. 2, 1965   3 Sheets-Sheet 3

United States Patent Office 3,240,461
Patented Mar. 15, 1966

3,240,461
SUCTION DEVICES
Alan Martin Singleton, 75 Monreith Road,
Glasgow S.3, Scotland
Filed Feb. 2, 1965, Ser. No. 429,857
1 Claim. (Cl. 248—206)

This invention has reference to suction devices of the kind comprising a flexible diaphragm, a housing with annular flange which bears on the diaphragm near the periphery thereof and means whereby the centre of the diaphragm can be drawn into the housing. When the diaphragm is applied to a flat surface and the centre of the diaphragm drawn into the interior of the housing the flange of the latter bears hard on the periphery of the diaphragm and the device caused to adhere tightly to the said surface by suction.

Suction devices of this have been provided with sockets into which the ends of a wire frame can be inserted, the suction device supporting the frame and the latter in turn supporting some article.

The present invention has for its object to provide a suction device of this type by which a greater range of articles can be supported thereby.

Figure 1:
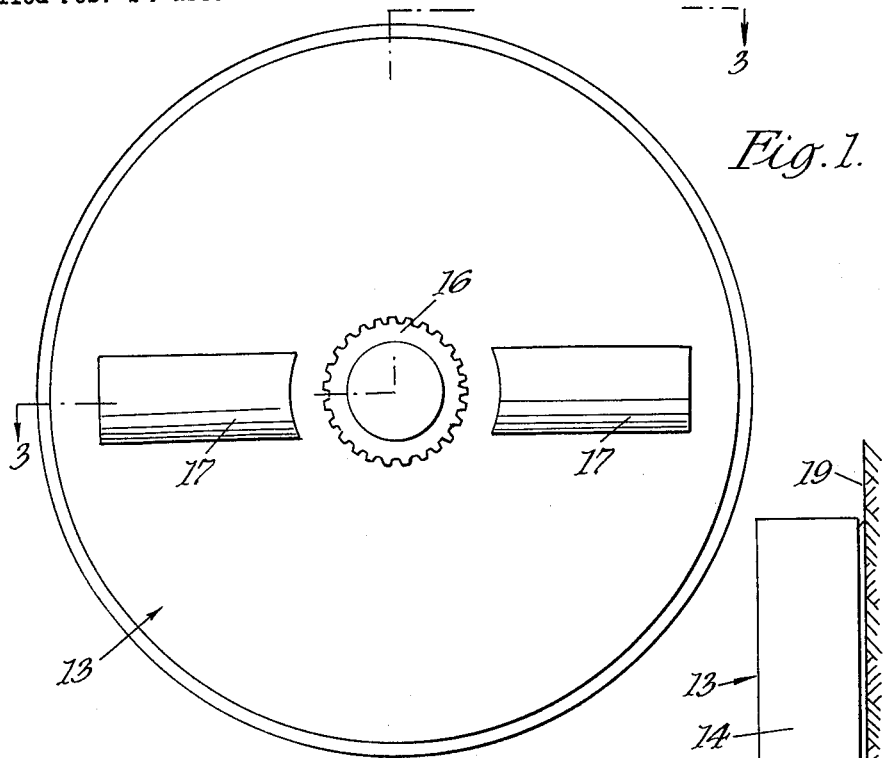
Figure 2:
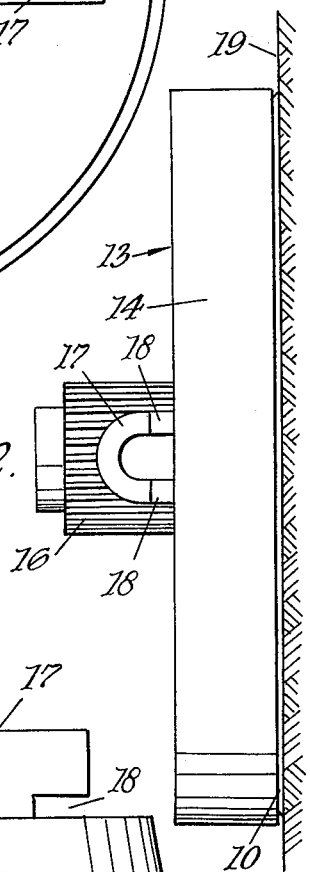
Figure 3:
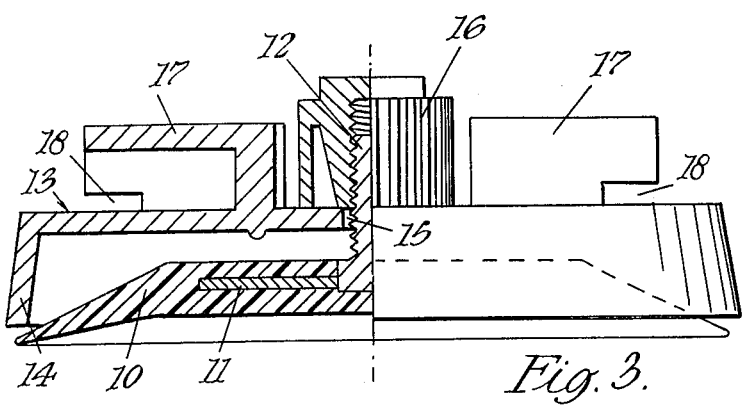

A preferred embodiment of the invention will now be described with reference to the accompanying drawings wherein:

FIGURE 1 is an elevation thereof;
FIGURE 2 is a side elevation thereof;
FIGURE 3 is a plan view thereof partly in section, the section being on the line 3—3 of FIGURE 1; and
FIGURES 4, 5, 6, 7 and 8 are perspective views of the suction device showing various attachments supported thereby.

As shown in the drawings the improved suction device comprises a circular diaphragm 10 of flexible plastic material or of rubber which has embedded centrally therein a metal disc 11 which carries a screw threaded stud or spindle 12. The diaphragm, when in repose, is of a shallow conical or dished formation. Fitted over the diaphragm is a housing 13 with surrounding annular flange 14 which bears on the diaphragm 10 near its periphery. The back of the housing is provided with a central hole 15 through which passes the screw threaded stud or spindle 12 and the depth of the flange 14 is such that when the housing and diaphragm are assembled there is a substantial clearance between the inner side of the housing and diaphragm. A nut 16 is screwed on to the stud or spindle and bears on the outer face of the back of the housing. The nut is knurled or provided with ribs or otherwise formed so that it can be easily turned by the fingers.

The housing has integral therewith two radially extending aligned sockets 17, 17, there being one on each side of the stud or spindle. The sockets are open at their outer ends. The side walls of the two sockets are cut away to form with the back of the housing open ended slots 18.

The device is secured to a fixture in known manner. That is, the diaphragm is forced on to a flat surface, designated 19, and thereafter the nut 16 is turned to draw the centre of the diaphragm 10 into the housing and causes the flange 14 of the housing to bear hard on the diaphragm near the periphery thereof. The device is thereby securely supported by suction.

Figure 4:
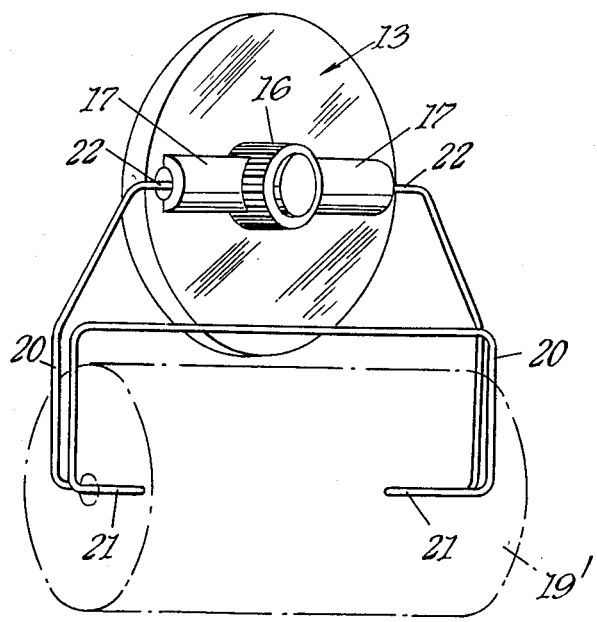

FIGURE 4 shows an attachment for supporting a toilet roll fitted to the suction device. Such attachment consists of a frame 20 formed of resilient wire bent to form two opposed U bends 21 for insertion in the bore of a toilet roll 19 and bent at its ends as at 22 for insertion in the sockets.

Figure 5:
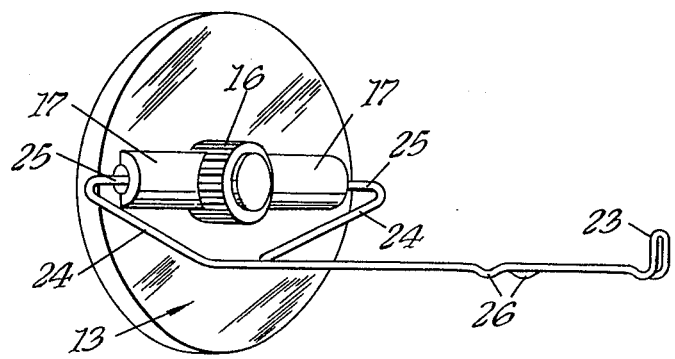

The attachment shown in FIGURE 5 consists in a stout resilient wire support for supporting one or more shirt or garment hangers. The wire is bent to U formation and is upwardly turned at its closed end as at 23. The other end of each limb of the U bend is splayed outwardly and upwardly as at 24 to bear on the housing and the two extremities are bent as at 25 so that they can be inserted in the sockets.

When the ends are so inserted the support extends outwardly from the housing. The limbs forming the U bend support the hangers, not shown, which rest in depressions 26 formed in the limbs.

Figure 6:
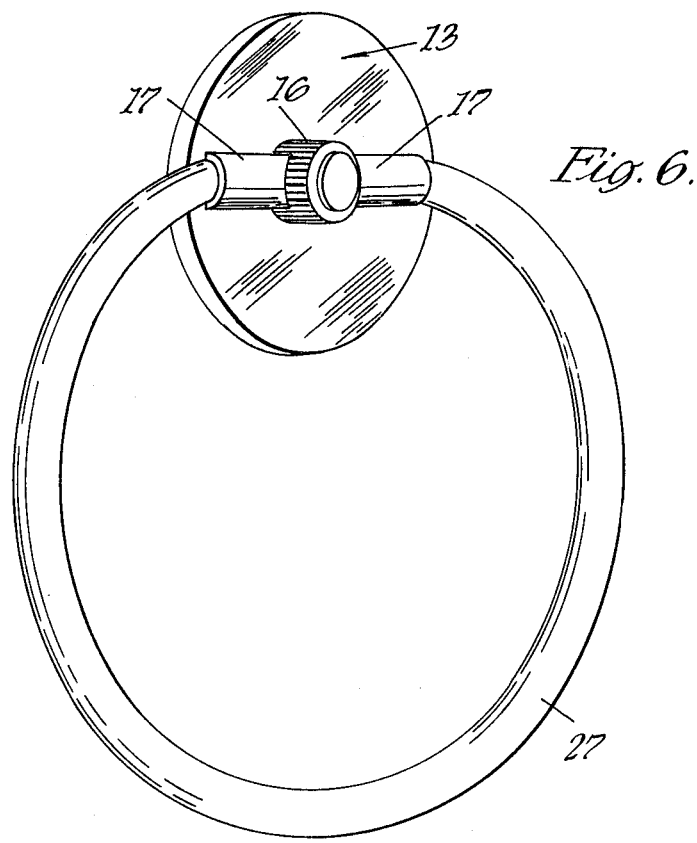

In FIGURE 6 the attachment is in the form of a ring 27 with gap therein which forms two ends, the ends extending into the sockets. Such attachment is very suitable for supporting towels, dish-cloths and such like.

Figure 7:
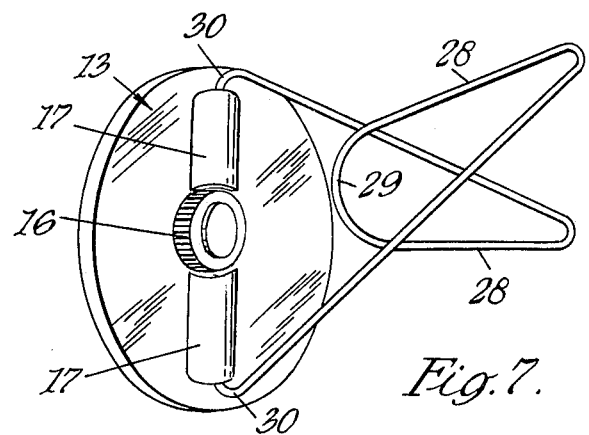

In FIGURE 7 the attachment is in the form of a wire bent to form two inter-crossing V bends 28 inter-connected by a substantially semi-circular bend 29 and, at their extremities, bent towards each other as at 30. The extremities are inserted in the sockets. The suction device is here shown with the sockets vertical so that the attachment occupies a vertical plane. The V bends form a spring clip to support articles introduced between the bends. The wire forming this attachment may be of such gauge that the extremities of several such attachments can be fitted in the sockets.

Figure 8:
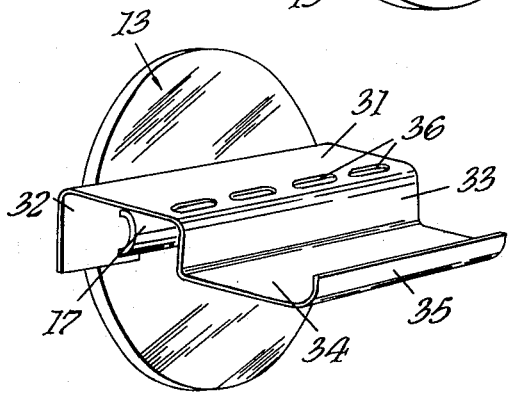

In FIGURE 8 the attachment is formed of sheet material shaped to form a channel consisting of a base 31, a downwardly turned rear flange 32 and a downwardly turned front flange 33 which is turned to form a tray 34 with upwardly turned lip 35. The flange 32 is cut to accommodate the nut 16 and also the sockets where they extend from their inner ends to the gap 18.

The base 31 is provided with a series of apertures 36 to receive the handles of tooth brushes and the tray serves to support one or more tubes of tooth paste.

This attachment is fitted to the suction device in such manner that the uncut ends of the flange 33 fit into the gaps 18 and the tray rests on the sockets.

The tray may be provided with a front and side walls so that it will form a soap holder or dish.

What I claim is:

A suction device comprising a flexible diaphragm, a housing formed by a back and annular flange which latter bears on the diaphragm near the periphery thereof, means extending centrally through the back of the housing by which the center of the diaphragm can be drawn into the interior of the housing so that the diaphragm will adhere by suction to any flat surface to which it is applied, two aligned sockets projecting from the back of the housing and each located on one side of the means by which the center of the diaphragm is drawn into the housing, the sockets being provided to receive the ends of an attachment formed of resilient wire, and the sockets forming with the back of the housing gaps into which the flanged end of a tray can be inserted so that the tray will be supported to extend outwardly from the housing.

References Cited by the Examiner

UNITED STATES PATENTS

| 2,147,861 | 2/1939 | Shopen | 248—206 |
| 2,420,811 | 5/1947 | Brewster et al. | 294—64 |

FOREIGN PATENTS

| 64,785 | 6/1955 | France. |
| 906,624 | 9/1962 | Great Britain. |
| 975,271 | 11/1964 | Great Britain. |

CLAUDE A. LE ROY, *Primary Examiner.*

FRANK L. ABBOTT, *Examiner.*

R. P. SEITTER, *Assistant Examiner.*